Patented Aug. 10, 1954

2,686,162

UNITED STATES PATENT OFFICE 2,686,162

RECLAIMING RUBBERS

William A. Hensley, Quincy, Ill., and Harry E. Albert, Akron, Ohio, assignors to The Firestone Tire & Rubber Company, Akron, Ohio, a corporation of Ohio No Drawing. Application April 2, 1952,
Serial No. 280,174

16 Claims. (Cl. 260—2.3)

This invention relates to the reclaiming of vulcanized conjugated diene polymer compositions.

"Conjugated diene polymer compositions" as used herein is meant to include natural rubber, copolymers of butadiene and styrene, copolymers of butadiene and acrylonitrile, 2-chlorobutadiene polymers, polybutadiene and other copolymerizates of 1,3-butadiene, isoprene or chloroprene with a polymerizable ethylene derivative as well as mixtures of two or more of these polymers.

"Reclaiming" as used herein may be understood to mean treating or processing waste vulcanized materials of the class broadly outlined above in such a manner as to obtain products which are plastic and processable and thus capable of again being used to produce new articles of manufacture.

Reclaiming is conventionally effected by subjecting vulcanizates of conjugated diene polymer compositions to elevated temperatures as for example by heating as in a "digester" or "heater" or by mechanically working as on a mill or in a Banbury or the like. In the digester process a ground vulcanizate is heated in a closed vessel under pressure in the presence of water and/or a cellulose destroying chemical until any fiber contained in the vulcanizate is wholly or partially destroyed and the vulcanizate is sufficiently plasticized to be processable and workable. The plasticized material is then washed, dried and milled.

The cellulose destroying chemicals utilized are usually either of a neutral or caustic nature. Examples of neutral cellulose destroying chemicals are zinc chloride, calcium chloride and the like. If no cellulose is contained in a scrap, of course no cellulose destroying chemical need be used in the reclaiming process and any such process may be termed a neutral process. Examples of caustic cellulose destroying chemicals are sodium hydroxide, potassium hydroxide, the other alkali metal hydroxides and other caustic chemicals.

In the heater process, ground vulcanizate is heated in an autoclave by live steam until the vulcanizate becomes plastic and workable. The plasticized vulcanizate is then removed from the autoclave, dried and milled. If the scrap contains cellulosics a cellulose destroying chemical can be utilized in the heater process. In the various mechanical reclaiming processes, scrap vulcanizate is worked at high temperatures on a mill, in a Banbury or the like until the vulcanizate has reached the desired state of plasticity.

While heat alone, under the conditions outlined above in the description of conventional reclaiming processes, is sufficient for reclaiming vulcanized natural rubber, it has been found advantageous to mix various oils, tars and resins with the vulcanized natural rubber to facilitate the reclaiming process. The oils and resins useful for this purpose are those which behave as swelling agents, plasticizers or tackifiers and are illustrated by the solvent naphthas, turpentine, dipentene, asphalt, pine tar, rosin, coumarone resins, rosin oil and the like. Although these oils and resins assist in softening scrap rubbers, they deleteriously affect the physical properties of a reclaim if they are used in large amounts. Particularly large amounts of such oils and resins are required to produce workable products from the various so-called vulcanized synthetic rubbers such as GR–S (rubbery copolymer of 1,3-butadiene and styrene), GR–A or N-type rubber (rubbery copolymer of 1,3-butadiene and acrylonitrile), GR–M or neoprene (polychloroprene) and the like. The resultant products from the synthetic rubber vulcanizates treated in this manner only, therefore, have poor physical properties.

Also useful and to be distinguished from the above oils and resins are certain chemicals which in relatively small proportions greatly promote the reclaiming of vulcanizates. These chemicals appear to act catalytically rather than in a solvent or lubricating manner and when present in relatively small amounts greatly decrease the necessity for the usual softening oils and the like. Such chemicals (or reclaiming agents) are particularly advantageous in reclaiming vulcanized synthetic rubbers and mixtures of a vulcanized synthetic rubber and vulcanized natural rubber.

An object, therefore, is to provide a class of chemical compounds of particular utility in reclaiming vulcanized rubber. Another object of the invention is to provide an improved method of reclaiming vulcanized conjugated diene polymer compositions. Another object is to provide improved reclaimed vulcanizates of conjugated diene polymer compositions. A still further object is to provide a method of reclaiming vulcanized conjugated diene polymer compositions requiring less of the usual reclaiming oils, tars and other solvent type softeners. Another object is to provide an improved method of reclaiming vulcanized synthetic rubbers or mixtures of vulcanized synthetic and natural rubbers. Another object is to provide a class of chemicals which in relatively small amounts are effective in reclaiming vulcanized conjugated diene polymer compositions in a caustic process as well as in a neutral process.

The above and further objects are obtained in accordance with the invention by heating a vulcanized conjugated diene polymer composition in the presence of a relatively small quantity of a sulfide of a N,N-di-(non-benzenoid substituent) aromatic amine. The two non-benzenoid substituents on the nitrogen of the aromatic amine may be aliphatic, cycloaliphatic, or together they may constitute a cyclo-alkylene radical or a cyclo-di-alkylene-oxy radical thus forming a non-benzenoid ring with the nitrogen. The two non-benzenoid substituents may be similar or dissimilar. Examples of aliphatic substituents are methyl, ethyl, propyl, butyl, amyl, hexyl, heptyl, octyl, decyl, dodecyl, benzyl, chloroethyl, bromoisopropyl, nitrophenylethyl and similar radicals. Examples of cycloaliphatic substituents include cyclohexyl and methyl-cyclohexy radicals. Examples of cyclo-alkylene radicals include cyclo-pentamethylene, methyl-cyclopentamethylene and cyclo-hexamethylene radicals. Examples of cyclo - di - alkylene-oxy radicals include cyclodiethylene-oxy and methyl-cyclodiethylene-oxy radicals.

The aromatic amines which form the active sulfides of the invention are those which have the general formula:

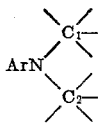

wherein Ar is an aromatic radical and $C_1$ and $C_2$ are carbon atoms included in aliphatic or cycloaliphatic radicals or both together are part of a non-benzenoid ring. The aromatic radical may be a benzenoid radical such as phenyl, naphthyl, anthracyl, biphenyl, terphenyl, phenanthryl and similar radicals or it may be a partially hydrogenated benzenoid radical such as tetrahydronaphthyl and like radicals wherein at least the benzene ring carrying the amino group is not hydrogenated. The aromatic radical may but need not be ring-substituted as with one or more halogen atoms, nitro groups, alkyl groups, cycloalkyl groups or alkoxy groups as long as at least one position ortho or para to the amino group is open for a sulfur linkage.

The sulfides of the invention are those wherein two or more molecules of an aromatic amine defined above are joined by on or more sulfur bridges connecting the aromatic rings. These sulfides are represented structurally by the following general formula:

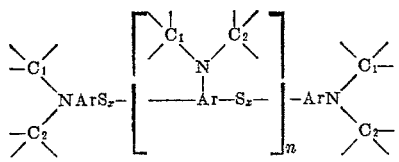

wherein $x$ is an integer from 1 to 4 and $n$ is any whole number including zero. For the sake of brevity the reclaiming agents of the invention will generally be referred to hereafter as aromatic amine sulfides.

*Preparation of sulfides of N,N-di-(non-benzenoid substituent) aromatic amines*

The aromatic amine sulfides active in promoting the reclaiming of vulcanized conjugated diene polymer compositions in accordance with the invention may be conveniently prepared by reacting in a suitable solvent an aromatic amine and a sulfur halide. Either a mono halide or a di halide may be used. The aromatic amine may be reacted with the sulfur halide in a mole ratio respectively of about 2:1 to form a bis(aromatic amine) sulfide. This ratio is, however, not critical since the resinous sulfides formed by reacting an excess of sulfur halide with the aromatic amine are also active reclaiming agents and included within the contemplation of the invention. While the aromatic amine sulfides of the invention are conveniently prepared by the sulfur halide reaction just outlined, their activity as reclaiming agents is not dependent upon their mode of preparation. They may, for example, also be prepared by heating a desired aromatic amine in the presence of free sulfur.

The aromatic amine sulfides referred to in the following specific Examples 1–37 were prepared in each instance by dissolving one mole of the desired N,N-di-(non - benzenoid substituent) aromatic amine in a suitable solvent such as carbon tetrachloride or ethylene dichloride. The amine solution was introduced into a three-necked flask equipped with a reflux condenser, a motor driven stirrer and a dropping funnel. A solution of a sulfur chloride was prepared by dissolving about one half mole of the sulfur chloride in the same kind of solvent used in preparing the amine solution. The sulfur chloride solution was then added dropwise to the amine solution. The reactions were started at from about 0° C. to about room temperature. Stirring of the reaction mixture was continued for one hour after all of the sulfur chloride had been added. Fifteen percent aqueous sodium hydroxide (100 ml. for a 0.1 mole run) was then added to the reaction mixture and stirring continued for an additional hour. In each instance two layers resulted, an organic layer and an aqueous layer. The organic layer was separated from the aqueous layer, washed with water and dried. The solvent was then removed by vacuum distillation leaving the crude aromatic amine sulfide. Quite advantageously, the crude sulfide may be used without further treatment to produce the desired results of the invention. The materials used in the following examples were, therefore, the crude amine sulfides in most instances. If desired, however, the amine sulfide may be purified and the aromatic amine sulfide used in accordance with the invention as a pure compound.

In the examples, sulfides were prepared by reacting a sulfur chloride according to the above procedure with the following aromatic amines:

N,N-di-methylaniline
N,N-di-ethylaniline
N,N-di-n-propylaniline
N,N-di-n-butylaniline
N,N-di-n-amylaniline
N,N-di-methyl-o-toluidine
N,N-di-methyl-m-toluidine
N,N-di-methyl-p-toluidine Several N,N-di-n-butyl aromatic amines were prepared by reacting one mole of the following aromatic amines with two moles of n-butyl bromide in accordance with the procedure described by Hickinbottom, W. J., "Reactions of Organic Compounds," Longmans, Green and Co., N. Y., 2nd ed., p. 300 (1948):

o-Toluidine
m-Toluidine
p-Toluidine
o-Anisidine
o-Phenetidine
2,5-dimethylaniline
α-Naphthylamine
β-Naphthylamine
m-Chloroaniline
3,5-dimethylaniline
2-methyl-5-chloroaniline
2-methyl-4-chloroaniline The sulfides of the resulting N,N-di-n-butyl aromatic amines were then produced by reacting these amines with sulfur chloride according to the procedure previously generally described. The utility of these resulting sulfides in the practice of the invention is illustrated in several of the examples.

N,N-di-n-propyl-m-toluidine and N,N-di-n-heptyl-m-toluidine were prepared by dialkylating m-toluidine respectively with propyl and heptyl bromide according to the procedure just related for producing the dibutyl amines. The resulting amines were reacted with sulfur chloride according to the previously described method.

Certain other dialkyl aromatic amines were produced by nitrating an aryl compound to produce a mononitro aromatic compound, reducing the nitro compound to produce the corresponding aromatic amine and then dialkylating the amine. As an illustration of this, amino tetralin was produced in accordance with Cumming and Howie, J. Chem. Soc., 1931, p. 3180. The resulting amino tetralin was then di-n-butylated according to the procedure previously outlined. The sulfide of the resulting N,N-di-n-butylaminotetralin was then produced in accordance with the procedure also previously described.

Similar to the preparation of the tetralin compound, ethyl naphthalene was nitrated, reduced and di-n-butylated to produce N,N-di-n-butyl-ethyl-naphthylamine. The sulfide of this compound was prepared in the usual manner.

Aromatic nitro compounds may be alkylated and reduced simultaneously. As an illustration of this procedure, 1,2,4-trimethylbenzene was nitrated. The resulting nitrobenzene was then dissolved in a mixture of ethyl alcohol and a small amount of acetic acid. To one mole of this nitrobenzene solution were added two moles of n-butyraldehyde. The mixture was then reacted in a Parr hydrogenation apparatus in the presence of Adam's platinum oxide catalyst and under 2-4 atmospheres of hydrogen. The resulting N,N-di-n-butyl-2,4,5-trimethylaniline was reacted with sulfur chloride in the usual way.

The sulfide used in Example 38 was prepared by reacting di-butyl-o-toluidine with sulfur chloride in the same manner utilized in producing previously described sulfides except that one mole of the toluidine and one instead of one-half mole of sulfur chloride were reacted.

It should be borne in mind that the above specific aromatic amine sulfides are only illustrative of types of materials suitable for practice of the invention. Many other aromatic amine sulfides also are active in reclaiming vulcanized conjugated diene polymer compositions. Some of these additional active reclaiming agents of the invention are illustrated by the sulfides of the following:

N,N-di-n-butyl-p-tert-amylaniline
N,N-di-n-butyl-di-tert-amylaniline
N,N-di-n-butyl-2,3,5,6-tetra-methylaniline
N,N-di-n-butyl-2,3,4,5-tetra-methylaniline
1-di-n-butylamino-2-methylnaphthalene
1-di-n-butylamino-4-methylnaphthalene
1-di-n-butylamino-3-methylnaphthalene
N,N-di-n-butyl-m-trifluoromethylaniline
N,N-di-n-butyl-3,5-dibromoaniline
N-benzyl-N-ethyl-m-toluidine
N,N-di-isopropylaniline
N,N-di-sec-butyl-m-toluidine
N,N-di-t-butylaniline
N-methyl-N-sec-amylaniline
N-methyl-N-sec-amyl-m-toluidine
N-methyl-N-dodecylaniline
N,N-di-2-ethylhexylaniline
N-ethyl-N-tt-octylaniline
N-methyl-N-nonylaniline
N,N-di-ethyl-m-ethylaniline
N,N-di-n-amyl-3,5-diethylaniline
N,N-di-n-amyl-2,4-diethylaniline
N,N-di-n-amyl-m-nitroaniline
2-di-n-butylamino-4-methylnaphthalene
2-di-n-butylamino-8-methylnaphthalene
N,N-di-n-butyl-4-(α-methylbenzyl)-aniline
Methylated α-pinene aniline
N-cyclohexyl-N-butylaniline
N,N-di-cyclohexylaniline
N-phenylmorpholine
N-phenylpiperidine Generally, the procedure for reclaiming, utilized in the specific examples which follow, involved heating a vulcanizate in the presence of a relatively small amount of a sulfur chloride-aromatic amine reaction product. The resulting material was then dried, cooled, mill-massed and subjected to three refining passes through a roll mill equipped with a refiner knife and set so that a piece of soft lead passed between the rolls would have a thickness of 0.005 inch. The properties of thickness, tack and body were observed after the third pass of the treated material through the refining mill. The thickness of a sheeted reclaim product is a function of the degree of softening of such product—the greater the thickness, the less the softening, and conversely the less the thickness, the greater the softening.

Tack may be defined as the tendency of a refined sheet to adhere to itself. Tack was estimated by laying a portion of a refined sheet across the hand and then pressing the thumb and the first finger together. Upon spreading apart the thumb and first finger, there was a definite force required to separate the two adhering surfaces. A rating of 5 was given to the force required to separate a sheet of typical natural rubber whole tire reclaim. Milled crude rubber was given a rating of 10 and crude GR-S with no tack was given a rating of zero. Values between those assigned to the controls mentioned above were estimated by the observer and could be duplicated easily by independent observers with an accuracy of plus or minus 1.

The body rating of the sheet was estimated by observing the stretch or elongation of the refined sheet, stretched by hand, and by the appearance and uniformity of the stretched sheet. The body was rated as very good (V-G), good (G), fair (F), poor (P), very poor (V-P), tough (T) and lacy (L) or as a combination of these. A good reclaim sheet must have satisfactory elongation without tearing, and a smooth uniform appearance. A poor reclaim sheet has poor stretch or elongation, tears and may be non-uniform, tough and lacy. The body evaluations were given numerical ratings as follows:

| | | |
|---|---|---|
| V-G | Very good | 6 |
| G | Good | 5 |
| G- | Good | 5- |
| F+ | Fair | 4½ |
| F | Fair | 4 |
| F- | Fair | 3½ |
| P-F | Poor—fair | 3 |
| P-L | Poor—lacy | 2 |
| P | Poor | 1 |
| P-T | Poor—tough | 1 |

By addition of the numerical body rating to the previously described tack rating there is obtained a "Quality Index" which is approximately equivalent to the overall workability of the reclaim as referred to in the reclaiming industry.

*Reclaiming vulcanized rubbers in a neutral process with sulfides of N,N-di-(non-benzenoid substituent) aromatic amines*

As illustrations of the practice of the invention in a so-called neutral process, a wide variety of aromatic amine-sulfur chloride reaction products were tested in the following general formula:

| | Parts by weight |
|---|---|
| GR-S tread scrap (ground to 5 mesh) | 100 |
| Dipentene | 6 |
| Coumarone indene resin | 6 |
| Reclaiming agent | 1.5 |

In the first series of examples, three batches of the above formulation were prepared. Each of two of the three batches contained a different N,N-dialkyl aromatic amine-sulfur chloride reaction product (shown in Table I) as a reclaiming agent. The remaining batch was used as a control and contained in lieu of an aromatic amine sulfide 0.7 additional parts by weight each of dipentene and coumarone indene resin. Each of the three batches were separately mixed and thereafter heated 4 hours in a pan heater at 175 p. s. i. steam pressure (377° C.). Each of the three mixtures was then dried, cooled, millmassed, refined, and evaluated as previously described. The results of the evaluation appear in Table I which follows:

TABLE I

| Example No. | Reclaiming Agent | Thickness | Body | Tack | Quality Index |
|---|---|---|---|---|---|
| Blank | None | 0.013 | P+(T) | 1+ | 3 |
| 1 | N,N-dimethyl-o-toluidine+$S_2Cl_2$. | 0.008 | P+ | 5 | 6½ |
| 2 | N,N-dimethyl-m-toluidine+$S_2Cl_2$. | 0.008 | F- | 5 | 8½ |

Referring to the results set out in Table I, it is apparent that a small proportion of an aromatic amine sulfide greatly promotes the reclaiming of a scrap rubber. The blank was not softened appreciably, had a poor body and essentially no tack; the blank was not reclaimed. The mixtures of Examples 1 and 2, treated in accordance with the invention, on the other hand had greatly improved properties of thickness, body and tack and were satisfactory reclaims.

Another series of dialkyl aromatic amine-sulfur chloride reaction products were mixed in the same formula used for Examples 1 and 2. The mixtures also were treated and evaluated in the same manner used for Examples 1 and 2. The results of the evaluations appear in Table II which follows:

TABLE II

| Example No. | Reclaiming Agent | Thickness | Body | Tack | Quality Index |
|---|---|---|---|---|---|
| 3 | N,N-dimethylaniline+$S_2Cl_2$. | 0.005½ | P-F | 2+ | 6 |
| 4 | N,N-diethylaniline+$S_2Cl_2$. | 0.004 | F | 4 | 8 |
| 5 | N,N-di-n-propylaniline+$S_2Cl_2$. | 0.004½ | F-G | 4 | 8 |
| 6 | N,N-di-n-butylaniline+$S_2Cl_2$. | 0.004½ | F | 3+ | 7 |
| 7 | N,N-di-n-amylaniline+$S_2Cl_2$. | 0.005 | F | 4 | 7½ |
| 8 | N,N-dimethyl-α-naphthylamine+$S_2Cl_2$. | 0.005½ | P-F | 3+ | 7 |

The materials of Examples 3-8, each of which were heated in the presence of a relatively minute quantity of a reclaiming agent in accordance with the invention, were substantially softened and had greatly improved body and tack. These materials were excellent reclaims.

Another series of aromatic amine-sulfur chloride reaction products were tested in the same formula used for Examples 1-8. The scrap used for this series was also GR-S tread scrap (ground to 5 mesh). The resulting mixtures were treated in the same manner as the mixtures of Examples 1-8 except that they were heated for five hours at 175 p. s. i. instead of four hours. The resulting reclaims were evaluated in the previously described manner and the results of this evaluation are set out in Table III which follows:

TABLE III

| Example No. | Reclaiming Agent | Thickness | Body | Tack | Quality Index |
|---|---|---|---|---|---|
| 9 | N,N-di-n-butyl-o-toluidine+$S_2Cl_2$. | 0.013 | F-T | 2+ | 6 |
| 10 | N,N-di-n-butyl-m-toluidine+$S_2Cl_2$. | 0.010 | G | 4 | 9 |
| 11 | N,N-di-n-butyl-p-toluidine+$S_2Cl_2$. | 0.013 | F-T | 2+ | 6 |
| 12 | N,N-di-n-butyl-2,5-dimethylaniline+$S_2Cl_2$. | 0.013 | F | 2+ | 6½ |
| 13 | N,N-di-n-butyl-o-anisidine+$S_2Cl_2$. | 0.013 | G-T | 1 | 5½ |
| 14 | N,N-di-n-butyl-o-phenetidine+$S_2Cl_2$. | 0.012 | F-T | 2 | 5½ |
| 15 | N,N-di-n-butyl-α-naphthylamine+$S_2Cl_2$. | 0.012 | G-T | 1 | 5½ |
| 16 | N,N-di-n-butyl-β-naphthylamine+SCl. | 0.012 | F-T | 2 | 5½ |

Referring to the results set out in Table III, it will be noted that the body, tack and overall workability values for the materials of Examples 9-16 show that satisfactory reclaims were produced.

*Example 17.*—Another sample of N,N-di-n-butyl-m-toluidine+$S_2Cl_2$ was tested in a vulcanized GR-S scrap very similar to that used in Examples 1-8. A blank and the above sample were mixed in the same formulations respectively as those used for the blank and the examples set out in Table I. The two mixtures were treated and evaluated according to the same procedure utilized in Examples 1-8. The results of the evaluations are as follows:

| Reclaiming agent | Thickness | Body | Tack | Quality Index |
|---|---|---|---|---|
| Blank | 0.013 | L | 1 | 1½ |
| N,N-di-n-butyl-m-toluidine+$S_2Cl_2$ | 0.008 | G | 4- | 8½ |

The activity of the above aromatic amine sulfide is apparent. An excellent reclaimed rubber was produced by the use of only a relatively small quantity of this sulfide. Without its use a very poor product resulted which was unsatisfactory as a reclaim.

To illustrate the effectiveness of the reclaiming agents of the invention on a vulcanizate other than GR-S five mixtures of the following general formulation were prepared.

| | Parts by weight |
|---|---|
| Neoprene (mechanical scrap) | 100 |
| Tall oil | 15 |
| Paraflux (petroleum asphalt residue) | 20 |
| Reclaiming agent | 10 |

The five mixtures each contained a different aromatic amine sulfide as a reclaiming agent designated in Table IV which follows. Another mixture of the same formulation except that it contained 10 additional parts by weight of Paraflux in lieu of a reclaiming agent was prepared as a control. The six mixtures were heated for 12 hours in a pan heater at 330° F. The resulting materials were then dried, cooled, mill-massed and subjected to three refining passes. The refined materials were then evaluated according to the previously described procedure and the results of the evaluation appears in Table IV which follows:

TABLE IV

| Example No. | Reclaiming Agent | Thickness | Body | Tack |
|---|---|---|---|---|
| Blank | None | 0.030 | F | 4 |
| 18 | N,N-di-n-butyl-m-toluidine+S$_2$Cl$_2$ | 0.011 | S | 7 |
| 19 | N,N-di-n-butyl-m-chlorobenzene+S$_2$Cl$_2$ | 0.013 | S | 6 |
| 20 | N,N-di-n-butylaniline+S$_2$Cl$_2$ | 0.013 | S | 6 |
| 21 | N,N-di-n-butylaminotetralin+S$_2$Cl$_2$ | 0.017 | S | 6— |
| 22 | N,N-di-n-butyl-3,5-dimethylaniline+S$_2$Cl$_2$ | 0.014 | S | 6 |

Referring to the results set out in Table IV, it is seen that the thicknesses of reclaim produced in accordance with the invention were much less than the thickness of the blank. Similarly, the tack of neoprene scrap heated in the presence of the various amine sulfides was greatly improved. The "S" designation appearing in the column showing body characteristics stand for "soft." Whereas, the blank had only a fair body, the samples treated with 10 parts of the reclaiming agents of the invention were somewhat over softened. This fact emphasizes the outstanding activity of the aromatic amine sulfides. With the formulation used in these examples somewhat smaller amounts of the reclaiming agents of the invention would be preferable.

*Reclaiming vulcanized rubbers in a caustic process with sulfides of N,N-di-(non-benzenoid substituent) aromatic amines*

The following examples will illustrate the advantageous use of the new class of reclaiming agents of the invention in a so-called caustic reclaiming process. The procedure and the evaluation of results was essentially the same as set out in the previous examples involving a neutral reclaiming process. The general scrap formula used in these tests was as follows:

|  | Parts by weight |
|---|---|
| GR–S tread scrap (ground to 5 mesh) | 100 |
| Aromatic reclaiming oil | 28 |
| Paraflux | 8 |
| NaOH aqueous solution (44%) | 11.5 |
| Reclaiming agent | 1.5 |

Wherever a blank was run in the following tests the mixture for the blank varied from the above formula only in having present an additional 1.5 parts of aromatic reclaiming oil in lieu of reclaiming agent. Unless otherwise indicated the mixtures in each instance were heated in a pan heater under 175 p. s. i. open steam for 4 hours. The thus treated mixtures were then each dried, blended, mill-massed and subjected to three passes on a refining mill. The resulting materials were evaluated in the same manner previously described.

A series of six mixtures of GR–S tread scrap were prepared in accordance with the above formula. One of these mixtures was a blank and five of the mixtures contained the reclaiming agents designated in Table V which follows. The mixtures were treated and evaluated in accordance with the procedures already outlined. The results of these evaluations appear in Table V. Examples 23 and 24 illustrate that sulfides produced from either a mono- or a di-halide of sulfur are effective in reclaiming conjugated diene polymers.

TABLE V

| Example No. | Reclaiming Agent | Thickness | Body | Tack | Quality Index |
|---|---|---|---|---|---|
| Blank | None | 0.008 | P | 1+ | 2½ |
| 23 | N,N-di-n-butyl-m-toluidine+S$_2$Cl$_2$ | 0.004 | G— | 4 | 8½ |
| 24 | N,N-di-n-butyl-m-toluidine+SCl$_2$ | 0.005 | F+ | 4 | 8 |
| 25 | N,N-di-n-butyl-2-methyl-5-chloroaniline+S$_2$Cl$_2$ | 0.006 | F | 3— | 6 |
| 26 | N,N-di-n-butyl-2-methyl-4-chloroaniline+S$_2$Cl$_2$ | 0.006 | F— | 3 | 6 |
| 27 | N,N-di-n-butyl-2,4,5-trimethylaniline+S$_2$Cl$_2$ | 0.005 | F— | 3 | 7 |

Further illustration of the practice of the invention is made by the results shown in Table VI of tests made according to the procedure outlined for Examples 23–27. Two additional aromatic amine sulfides were tested along with a blank and another sample of N,N-di-n-butyl-m-toluidine—S$_2$Cl$_2$ reaction product. The blank was not reclaimed; satisfactory reclaims were provided in accordance with the invention by all of the Examples 28–30.

TABLE VI

| Example No. | Reclaiming Agent | Thickness | Body | Tack | Quality Index |
|---|---|---|---|---|---|
| Blank | None | 0.011 | F—T | 2 | 5½ |
| 28 | N,N-di-n-butyl-m-toluidine+S$_2$Cl$_2$ | 0.006 | G | 5— | 9½ |
| 29 | N,N-di-n-butylaminoethylnaphthalene+S$_2$Cl$_2$ | 0.008 | F—G | 3— | 7 |
| 30 | N,N-di-n-butylaminotetralin+S$_2$Cl$_2$ | 0.006 | G | 4+ | 9½ |

Another series of aromatic amine sulfides in accordance with the invention were tested in the caustic process previously outlined. The results of these tests appear in Table VII which follows. All of the reclaims of Examples 31–35 were excellent.

TABLE VII

| Example No. | Reclaiming Agent | Thickness | Body | Tack | Quality Index |
|---|---|---|---|---|---|
| 31 | N,N-di-ethyl-m-toluidine+S$_2$Cl$_2$ | 0.012 | F | 2 | 6 |
| 32 | N,N-di-n-propyl-m-toluidine+S$_2$Cl$_2$ | 0.009 | G— | 4 | 8½ |
| 33 | N,N-di-n-butyl-m-toluidine+S$_2$Cl$_2$ | 0.006 | G | 5 | 10 |
| 34 | N,N-di-n-heptyl-m-toluidine+S$_2$Cl$_2$ | 0.007 | G | 5 | 10 |
| 35 | N,N-di-n-butyl-m-chloroaniline+S$_2$Cl$_2$ | 0.011 | G—F | 3 | 7½ |

An additional aromatic amine sulfide was tested along with another sample of N,N-di-n-butyl-m-toluidine—S$_2$Cl$_2$ reaction product according to the above procedure. The results of these tests appear in Table VIII which follows. Both the products of Examples 36 and 37 were excellent reclaims.

TABLE VIII

| Example No. | Reclaiming Agent | Body | Tack | Quality Index |
|---|---|---|---|---|
| 36 | N,N-di-n-butyl-m-toluidine+S₂Cl₂ | F | 5 | 9 |
| 37 | N,N-di-n-butyl-3,5-dimethyl-aniline+S₂Cl₂ | F–G | 5 | 9½ |

*Example 38.*—An aromatic amine sulfide, produced by reacting one mole of S₂Cl₂ and one mole of N,N-di-n-butyl-o-toluidine, was mixed in the following formula:

Parts by weight
GR–S tread scrap (5 mesh) _____ 100
Aromatic reclaiming oil _____ 28
Paraflux _____ 8
NaOH aqueous solution (50%) _____ 11.5
N,N-di-n-butyl-o-toluidine+S₂Cl₂ _____ 1.5

The mixture was heated and evaluated in the previously described manner and a satisfactory reclaim resulted having the following properties:

Thickness _____ 0.007
Body _____ F–T
Tack _____ 3
Quality Index _____ 6½

*Example 39.*—A factory scale batch of the following ingredients was loaded into a digester:

Giant tires (4 mesh)[1] _____pounds__ 5500
NaOH (5.9% aqueous solution) ___gallons__ 900
Water _____do____ 440
Aromatic reclaiming oil _____pounds__ 350
N,N-di-n-butyl-m-toluidine+S₂Cl₂ _do____ 27.5

[1] Tires containing about 65% natural rubber and about 35% GR–S rubber.

The above mixture was cooked for 12 hours under a steam pressure of 175 pounds. The heated mixture was then washed, dried, millmassed, refined and evaluated in the usual manner. The resulting reclaimed rubber had the following properties:

Thickness _____ 0.008
Body _____ P
Tack _____ 6
Quality Index _____ 7

It should be noted that the mixture of Example 39 contained only 0.5 part by weight of a reclaiming agent and 10 parts by weight of a softening oil, both per 100 parts of scrap rubber. Despite this fact a reclaim was produced having a small thickness, excellent tack and a relatively high quality index. To improve the body, however, slightly more reclaiming agent would be preferable in this formula.

While N,N - di - (non - benzenoid substituent) aromatic amine sulfides generally have been shown to be active reclaiming agents for vulcanized conjugated diene polymer compositions, the above and further tests indicate that the most active of these materials are those which have alkyl, cycloalkyl, alkoxy, nitro or halogen substituents on the aromatic ring meta to the amine group. Similarly to the meta substituted anilines, increased activity is indicated for the naphthylamine derivatives having a like substituent meta to the amine group. The meta substituted aromatic amine sulfides are, therefore, to be preferred.

The present invention includes not only the process of reclaiming vulcanized conjugated diene polymer compositions by means of aromatic amine sulfides but also the products obtained thereby. The reclaimed products of the invention not only have greatly improved properties but appear to have compositions differing considerably from those of previously known reclaims. There appears to be a chemical reaction between vulcanized conjugated diene polymer compositions and at least some of an aromatic amine sulfide heated therewith.

The invention is not limited to the specific processes, conditions or quantities set out in the specific examples. Scrap vulcanized natural rubber, scrap vulcanized GR–S and mixed scraps containing both vulcanized natural and vulcanized GR–S are, at the present time, the materials usually desired to be reclaimed commercially in large quantities. The reclaiming agents of the invention are, however, not only very effective in reclaiming such vulcanizates but also are effective reclaiming agents for the other vulcanized conjugated diene polymer compositions such as neoprene, N-type rubbers, butyl rubber (rubbery copolymer of isobutylene and isoprene or butadiene) and the like. The conjugated diene polymer compositions, upon which the reclaiming agents are particularly effective, are usually those which have been vulcanized in the presence of sulfur or in the presence of sulfur-containing vulcanizing agents such as sulfur halides, polysulfides of phenols, cresols or amines, dialkyl xanthogen sulfides, tetraalkylthiuram sulfides and the like. The reclaiming agents of the invention, however, show demonstrable reclaiming activity on non-sulfur cured vulcanizates such as those obtained by curing in the presence of a metal oxide (notably the chlorobutadiene polymers), phenol-formaldehyde resins (notably the butadiene-acrylonitrile polymers), quinones, quinone dioximes, other quinone derivatives, nitroso compounds and other compounds known to vulcanize chemically unsaturated elastomers.

The amount of a reclaiming agent of the invention required to obtain the desired results is not particularly critical and may be varied from about 0.05 to 15 or even more parts by weight per 100 parts of vulcanized scrap. Ordinarily only a relatively small quantity of the reclaiming agent is necessary. The temperatures and pressures used in the various examples are also not critical and are limited only by equipment and economic considerations. Temperatures have been varied over a range of from about 150° F. to 550° F. and steam under a gage pressure as high as 900 p. s. i. has been utilized.

The invention may be practiced by employing the reclaiming agents thereof without or along with other conventional reclaiming chemicals. The invention may be employed in combination with any of the usual physical means used in reclaiming. As previously indicated one particular advantage of the invention resides in its effectiveness in a caustic process as well as in a neutral process. Other variations of the practice of the invention will occur naturally to those skilled in the art and are within the contemplations of the invention.

We claim:

1. A process of reclaiming a vulcanized conjugated diene polymer composition which comprises heating said composition in the presence of a N,N-di-n-butyl-m-toluidine sulfide.

2. A process of reclaiming a vulcanized conjugated diene polymer composition which comprises heating said composition in the presence of a N,N-di-n-butyl-m-chloroaniline sulfide.

3. A process of reclaiming a vulcanized conjugated diene polymer composition which comprises heating said composition in the presence of a N,N-di-n-butyl-aminotetralin sulfide.

4. A process of reclaiming a vulcanized conjugated diene polymer composition which comprises heating said composition in the presence of a N,N-di-n-butyl-2,4,5-trimethylaniline sulfide.

5. A process of reclaiming a vulcanized conjugated diene polymer composition which comprises heating said composition in the presence of a N,N-di-n-butylaniline sulfide.

6. A reclaimed, vulcanized conjugated diene polymer composition produced by the method of claim 11.

7. A reclaimed vulcanized conjugated diene polymer composition produced by the method of claim 13.

8. A reclaimed vulcanized rubbery copolymer of styrene and 1,3-butadiene produced by the process of claim 14.

9. A process of reclaiming a vulcanized conjugated diene polymer composition which comprises heating said composition in the presence of a relatively small quantity of an aromatic amine sulfide having the formula:

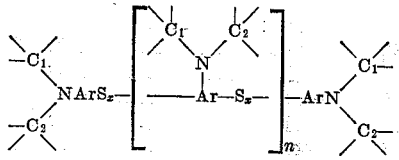

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

10. A process of reclaiming a vulcanized conjugated diene polymer composition which comprises heating the composition in the presence of a reaction product of a sulfur halide and an aromatic amine having the formula:

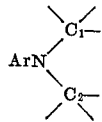

wherein Ar is an aromatic radical, N is directly connected to a ring of the aromatic radical and $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$.

11. A process of reclaiming a vulcanized conjugated diene polymer composition which comprises heating said composition in the presence of caustic and an aromatic amine sulfide having the formula:

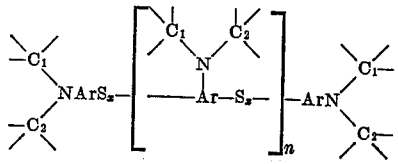

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

12. A process of reclaiming a vulcanized conjugated diene polymer composition which comprises heating said composition in the presence of caustic and an aromatic amine sulfide having the formula:

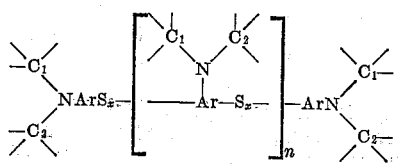

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in alkyl radicals, $x$ is an integer from 1 to 4 and $n$ is any whole number including zero.

13. A process of reclaiming a vulcanized rubbery copolymer of styrene and 1,3-butadiene which comprises heating said vulcanized copolymer in the presence of an aromatic amine sulfide having the formula:

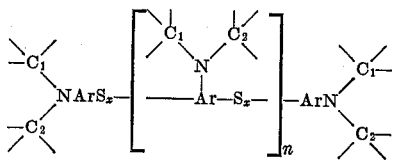

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

14. A process of reclaiming a vulcanized rubbery copolymer of styrene and 1,3-butadiene which comprises heating said vulcanized copolymer in the presence of caustic and an aromatic amine sulfide having the formula:

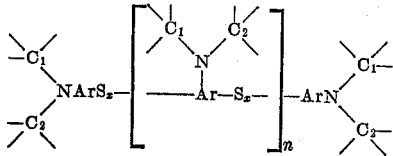

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

15. A process of reclaiming a mixture of vulcanized natural rubber and vulcanized rubbery copolymer of styrene and 1,3-butadiene which comprises heating said mixture in the presence of an aromatic amine having the formula:

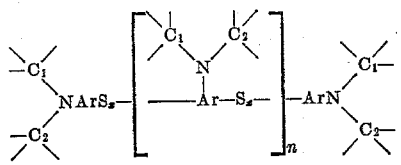

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

16. A process of reclaiming a vulcanized polychloroprene which comprises heating the vulcanized polychloroprene in the presence of an aromatic amine having the formula:

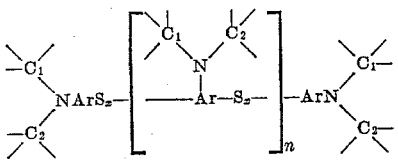

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

References Cited in the file of this patent

UNITED STATES PATENTS

| Number | Name | Date |
| --- | --- | --- |
| 2,097,473 | Semon | Nov. 2, 1937 |
| 2,370,756 | Sibley | Mar. 6, 1945 |
| 2,470,945 | Paul | May 24, 1949 |
| 2,470,948 | Paul | May 24, 1949 |
| 2,502,150 | Hook | Mar. 28, 1950 |
| 2,530,355 | Hook | Nov. 14, 1950 |
| 2,581,919 | Albert | Jan. 8, 1952 |

FOREIGN PATENTS

| Number | Country | Date |
| --- | --- | --- |
| 284,829 | Great Britain | Feb. 9, 1928 |

OTHER REFERENCES

"Reclaiming Agents for Synthetic Rubber," July 1948, Ind. and Eng. Chem., vol. 40, No. 7, pages 1194–1202.